3,560,540
Patented Feb. 2, 1971

3,560,540
TRIHYDROCARBYL TIN (CYANO) (HALO) PHENOLATES
Adolph J. Deinet, 22 Oakwood Drive,
Woodcliff Lake, N.J. 07675
No Drawing. Filed Feb. 19, 1969, Ser. No. 800,741
Int. Cl. C07f 7/22; A01n 9/00; B21b 19/04
U.S. Cl. 260—429.7                                    2 Claims

ABSTRACT OF THE DISCLOSURE

Organotin compounds that have the structural formula

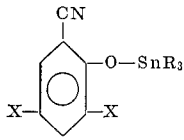

wherein each R represents an alkyl group having from 4 to 8 carbon atoms or a phenyl group; one of the X substituents represents halogen; and the other X substituent represents hydrogen or halogen are effective in the control of the growth of undesirable organisms.

---

This invention relates to novel organotin compounds. More particularly it relates to substituted phenoxy tin compounds and to a process for their preparation. It further relates to the use of these compounds in the control of the growth of undesirable organisms.

In accordance with this invention, it has been found that certain substituted phenoxy tin compounds have unusual and valuable activity as fungicides, insecticides, and selective herbicides. These compounds may be represented by the structural formula

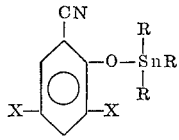

wherein each R represents an alkyl group having from 4 to 8 carbon atoms or a phenyl group; one of the X substituents represents chlorine, bromine, iodine, or fluorine; and the other X substituent represents hydrogen, chlorine, bromine, iodine, or fluorine. Illustrative of these compounds are the following: tri-n-butyl (2-cyano-4-chlorophenoxy) tin; tri-n-butyl (2-cyano-6-chlorophenoxy) tin; tri-n-butyl (2-cyano-4,6-dichlorophenoxy) tin; tri-n-hexyl (2-cyano-4-bromophenoxy) tin; tri-n-octyl (2-cyano-6-bromophenoxy) tin; tri-n-octyl (2-cyano-4-bromo-4,6-diiodophenoxy) tin; triphenyl (2 - cyano-4,6-difluorophenoxy) tin; triphenyl (2-cyano-4,6-dibromophenoxy) tin; triphenyl (2-cyano-4-iodophenoxy) tin; tri-2-ethylhexyl (2-cyano-4-fluorophenoxy) tin; and the like.

The substituted phenoxy tin compounds may be prepared, for example, by the reaction of the appropriate halogenated 2-hydroxybenzonitrile with a trialkyl tin hydroxide or triphenyl tin hydroxide in a hydrocarbon or ketone solvent or by the reaction of an alkali metal salt of a halogenated 2-hydroxybenzonitrile with a trialkyl tin chloride or triphenyl tin chloride in a suitable solvent.

The biocidal compounds of this invention may be applied to a wide variety of fungi, plants, insects, and other pests to control or inhibit their growth. They are of particular value in the control of the growth of fungi.

In a preferred embodiment of the invention, the substituted phenoxy tin compounds are used to impart fungal resistance to a wide variety of surface-coating compositions including both organic solvent-based and water-based coating systems. They are particularly valuable as fungicides in coatings that contain as their resinous binder either an oleoresinous material or a water-insoluble synthetic linear addition polymer.

The oleoresinous materials that may be used as binders in these water-based and solvent-based surface coating compositions include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the aforementioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids. Alternatively, the water-based composition may contain as binder a synthetic linear addition polymer. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinylidine chloride; polyethylene; polyisobutylene; polystyrene; copolymers of styrene with butadiene; copolymers of acrylonitrile with butadiene; copolymers of methacrylic acids esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the substituted phenoxy tin compound need be present in these surface-coating compositions. As little as 0.10% of the substituted phenoxy tin compound, based on the weight of the composition, will bring about an appreciable improvement in the resistance of the composition to attack by fungi. Approximately 5.0% or more of the fungicide, based on the weight of the composition, can be used, but these larger amounts generally do not provide further improvement in the properties of the surface-coating compositions and for this reason are not ordinarily used. While the amount of the fungicide that will provide optimum protection for the surface-coating compositions depends upon such factors as the choice of organotin compound, the choice of resinous binder and other components of the composition, the amount of each that is employed, and the application for which the coating composition is intended, in most cases about 0.25 percent to 2.0 percent of the substituted phenoxy tin compound, based on the weight of the surface-coating composition, is used.

In addition to the resinous binder and the fungicide, the surface-coating compositions of the present invention may contain various auxiliary materials, such as pigments, extenders, solvents, dyes, defoaming agents, driers, emulsifying agents, dispersing agents, plasticizers, other fungicides, bactericides, and corrosion inhibitors, in the amounts ordinarily used for these purposes.

The substituted phenoxy tin compound that is used as the fungicide may be incorporated into the surface-coating composition by any convenient procedure. For example, it can be combined with the pigments and various other components to form a pigment phase that is then mixed with the resinous binder and water or an organic solvent to form the surface-coating composition. Alternatively, it can be added to a composition that contains the resinous binder, pigment, and water or organic solvent. The organotin compound can be added as such to the other components of the surface-coating composition, or it can be added as a solution of the organotin compound in a solvent, such as an alcohol, ether, or ketone.

In other preferred embodiments of the invention, the compounds are applied to a wide variety of plant and animal pests to control or inhibit their growth. While each of these compounds has been found to be effective in the control of the growth of certain of the aforementioned pests, the particular type of organism upon which each exerts its major effect is largely dependent upon the nature of the substituents on the phenoxy group and on the tin atom.

The locus in which pest control is to be effected may, if desired, be treated with the compounds of this invention, or the compounds may be applied directly to the organisms whose growth is to be controlled.

While the substituted phenoxy tin compounds may be used as such in the control of the growth of undesirable organisms, they are usually and preferably used in combination with an inert carrier which facilitates the dispensing of dosage quantities of the compounds and assists in their absorption by the organism. The pesticidal compounds may be mixed with or deposited upon inert particulate solids, such as fullers earth, talc, diatomaceous earth, hydrated calcium silicate, kaolin, and the like to form dry particulate compositions. Such compositions may, if desired, be dispersed in water with or without the aid of surface-active agents. The pesticidal compounds are preferably dispensed in the form of solutions or dispersions in inert organic solvents, water or mixtures of inert organic solvents and water, or as oil-in-water emulsions. The concentration of the active materials in the pesticidal compositions may vary within wide limits and depends upon a number of factors, the most important of which are the type or types of undesirable organisms being treated and the amount of the composition to be applied. If desired, mixtures of two or more of the novel compounds as well as other pesticidal compounds may be present in the compositions.

The invention is further illustrated by the examples that follow.

EXAMPLE 1

To a solution of 18.8 grams (0.1 mole) of 2-hydroxy-3,5-dichlorobenzonitrile in 160 grams of methyl ethyl ketone was slowly added 11.4 grams (0.1 mole) of a 50 percent by weight solution of potassium hydroxide. To the resulting solution at 25°–30° C. was slowly added 32.4 grams (0.1 mole) of tri-n-butyl tin chloride. The reaction mixture was heated at its reflux temperature for two hours, cooled, and filtered. The filtrate was evaporated to dryness, and the residue was dissolved in 300 ml. of benzene. The benzene solution was washed three times with 150 ml. portions of water and then heated under vacuum to remove the benzene. There was obtained 45.7 grams (95.8 percent yield) of tri-n-butyl (2-cyano-4,6-dichlorophenoxy) tin, a yellow semi-crystalline material that contained 15.78 percent of chlorine and 24.37 percent of tin (calculated, 14.87% Cl and 24.9% Sn).

EXAMPLE 2

An acetone solution was prepared by dissolving 100 mg. of the product of Example 1 in 10 ml. of acetone that contained 2000 p.p.m. of sorbitan trioleate and 5000 p.p.m. of a polyoxyethylene ether of sorbitan monooleate. The acetone solution was dispersed in 90 ml. of distilled water to form an aqueous solution that contained 1000 p.p.m. of the organotin compound. More dilute solutions were prepared by adding distilled water to this solution.

EXAMPLE 3

A series of tests was carried out in which the product of Example 1 was evaluated as a selective herbicide. In the tests groups of greenhouse-flats containing soil were planted with seeds of various crop plants and weeds. In the preemergence tests the soil after planting was sprayed with an aqueous solution prepared by the procedure of Example 2. In the postemergence tests the solution was applied two to four weeks after planting. The effectiveness of the treatment was determined by comparing the treated plants with untreated plants. In Table I a rating of 0 indicates no herbicidal activity; 1 to 3 indicates slight injury; 4 to 6 indicates moderate injury; 7 to 9 indicates severe injury; and 10 indicates destruction of all plants.

TABLE I.—ACTIVITY OF TRI-N-BUTYL (2-CYANO-4,6-DICHLOROPHENOXY) TIN AS A SELECTIVE HERBICIDE

| Plant species | Preemergence dosage (pounds/acre) | | | Postemergence dosage (pounds/acre) | | |
|---|---|---|---|---|---|---|
| | 10 | 5 | 2.5 | 10 | 5 | 2.5 |
| Clover | 10 | 10 | 0 | 10 | 8 | 5 |
| Sugar beet | 0 | 0 | 0 | 6 | 5 | 5 |
| Soybean | 0 | 0 | 0 | 10 | 9 | 7 |
| Cotton | 0 | 0 | 0 | 10 | 10 | 10 |
| Corn | 3 | 0 | 0 | 6 | 6 | 4 |
| Oats | 3 | 0 | 0 | 7 | 5 | 4 |
| Mustard | 10 | 10 | 8 | 10 | 10 | 10 |
| Morning glory | 0 | 0 | 0 | 10 | 10 | 9 |
| Buckwheat | 4 | 0 | 0 | 10 | 10 | 10 |
| Crab grass | 10 | 0 | 0 | 7 | 5 | 3 |
| Rye grass | 8 | 0 | 0 | 9 | 7 | 0 |
| Foxtail | 9 | 0 | 0 | 8 | 5 | 2 |

EXAMPLE 4

A series of tests was carried out in which solutions prepared by the procedure of Example 2 were applied to plants infested with various insects. In no case was there appreciable injury to the plants. The results obtained are summarized in Table II.

TABLE II.—ACTIVITY OF TRI-N-BUTYL (2-CYANO-4,6-DICHLOROPHENOXY) TIN AS AN INSECTICIDE

| Rate of application (p.p.m.) | Percent control of insect | | |
|---|---|---|---|
| | Mexican bean beetle | Pea aphid | 2-spotted spider mite |
| 250 | 100 | 93 | 100 |
| 125 | 57 | 20 | 100 |
| 50 | 47 | | 100 |

EXAMPLE 5

Separate lots of sterilized soil were inoculated with plant pathogens. The inoculated soil was placed in 4-ounce containers, and the soil in each container was drenched with 30 ml. of an aqueous solution prepared according to the procedure of Example 2. After incubation for two days at 70° F., the amount of mycelial growth on the surface of the soil was noted. The results obtained are summarized in Table III.

TABLE III.—ACTIVITY OF TRI-N-BUTYL (2-CYANO-4,6-DICHLOROPHENOXY) TIN AS A SOIL FUNGICIDE

| Rate of Application (p.p.m.) | Percent control of fungus | | |
|---|---|---|---|
| | Sclerotium rolfsii | Pythium Sp. | Rhizoctonia solani |
| 50 | 96 | 100 | 100 |
| 25 | 95 | 33 | 67 |
| 12.5 | 91 | | |

EXAMPLE 6

A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| Aqueous solution of methylcellulose (2%) | 200 |
| Diethyl ether of diethylene glycol | 37 |
| Aqueous solution containing 55% by weight of polyvinyl acetate | 350 |

To samples of this paint were added the amounts of tri-n-butyl (2-cyano-4,6-dichlorophenoxy) tin indicated in Table V. For comparative purposes, samples were prepared that contained either phenylmercuric acetate or benzene in place of the organotin compound.

The following standard testing procedure was used: Pieces of drawdown paper were dipped into each of the treated paints, dried for 24 hours, and again dipped into the paint and dried. The coated paper samples were cut into 1¼" squares. Each of the coated paper squares thus prepared was placed on a plate of malt and mycophil agar, which had previously been inoculated with 1 ml. of a suspension of the test organism. The plates, prepared in triplicate, were incubated at 28° C. and observed weekly. The growth was estimated according to the following key, and the results of the replicate plates were averaged:

ZO=Zone of inhibition in mm.
O=No zone of inhibition

The results obtained are summarized in Table IV.

TABLE IV

| | Fungicide | | | | | |
|---|---|---|---|---|---|---|
| | Tri-n-butyl (2-cyano-4,6-dichlorophenoxy) tin | | Phenylmercuric acetate | | Benzene | |
| Percent fungicide | 2% | 1% | 2% | 1% | 2% | 1% |
| Effect on color of paint | None | None | None | None | None | None |
| Effect on viscosity of paint | None | None | None | None | None | None |
| Pullularia pullulans | ZO-22 | ZO-17 | ZO-21 | ZO-17 | 0 | 0 |
| Penicillium crustosum | ZO-11 | ZO-10 | ZO-12 | ZO-10 | 0 | 0 |
| Aspergillus niger | ZO-11 | ZO-10 | ZO-12 | ZO-11 | 0 | 0 |

EXAMPLE 7

To sample of the polyvinyl acetate emulsion paint whose preparation was described in Example 6 and to samples of an alkyd-resin based paint were added 2 percent by weight of a fungicide. Pieces of drawndown paper were dipped into the paint. After a 24-hour drying period, one of the samples coated with each of the treated paints was leached for 24 hours in accordance with Method 5831, CCC-T-1916. The coated paper samples were cut into 1¼" squares, which were evaluated by the procedure described in Example 6.

The alkyd-resin based paint that was used in this test was prepared by mixing together the following materials:

| | Parts by weight |
|---|---|
| Titanium dioxide (anatase) | 100 |
| Titanium dioxide (rutile) | 100 |
| Talc | 356 |
| Alkyd resin (long oil) | 389 |
| Mineral spirits | 163 |
| Zinc naphthenate (8%) | 4.9 |
| Calcium naphthenate (4%) | 12.1 |
| Cobalt naphthenate (6%) | 1.6 |

The results obtained are summarized in Table V. In this table ZO=zone of inhibition in mm.; 0=no growth; 1–10=increasing amounts of growth; and *=weeks of incubation at 20° C. and 90% relative humidity.

TABLE V

| | Fungicide | | | |
|---|---|---|---|---|
| | Tri-n-butyl (2-cyano-4,6-dichlorophenoxy) tin | PMA[1] | Vancide PA[2] | Dow 13[2] | None |
| Polyvinyl acetate paint: | | | | | |
| *P. pullulans:* | | | | | |
| Unleached: | | | | | |
| 1 week* | ZO-2 | 0 | 0 | ZO-5 | 10 |
| 2 weeks | 0 | 0 | 0 | ZO-5 | 10 |
| 4 weeks | 0 | 0 | 0 | ZO-5 | 10 |
| Leached: | | | | | |
| 1 week* | 0 | 0 | 0 | ZO-3 | 10 |
| 2 weeks | 0 | 0 | 0 | ZO-3 | 10 |
| 4 weeks | 0 | 0 | 0 | ZO-3 | 10 |
| *A. niger:* | | | | | |
| Unleached: | | | | | |
| 1 week* | ZO-3 | ZO-11 | 0 | 0 | 10 |
| 2 weeks | ZO-3 | ZO-11 | 1 | 0 | 10 |
| 4 weeks | ZO-3 | ZO-10 | 3 | 0 | 10 |
| Leached: | | | | | |
| 1 week* | ZO-3 | ZO-6 | 2 | 0 | 10 |
| 2 weeks | ZO-3 | ZO-6 | 10 | 0 | 10 |
| 4 weeks | ZO-3 | 0 | 10 | 0 | 10 |
| Alkyd-resin based paint: | | | | | |
| *P. pullulans:* | | | | | |
| Unleached: | | | | | |
| 1 week* | 2 | 0 | 0 | ZO-5 | 8 |
| 2 weeks | 4 | 0 | 0 | ZO-5 | 10 |
| 4 weeks | 5 | 0 | 0 | ZO-4 | 10 |
| Leached: | | | | | |
| 1 week* | 4 | 0 | 0 | ZO-5 | 5 |
| 2 weeks | 6 | 0 | 0 | ZO-5 | 8 |
| 4 weeks | 6 | 0 | 0 | ZO-4 | 10 |
| *A. niger:* | | | | | |
| Unleached: | | | | | |
| 1 week* | 0 | ZO-5 | 0 | 0 | 2 |
| 2 weeks | 0 | ZO-5 | 0 | 2 | 4 |
| 4 weeks | 1 | ZO-5 | 2 | 2 | 4 |
| Leached: | | | | | |
| 1 week* | 0 | ZO-7 | 0 | 2 | 2 |
| 2 weeks | 0 | ZO-7 | 0 | 2 | 4 |
| 4 weeks | 0 | ZO-7 | 2 | 2 | 4 |

[1] Phenylmercuric acetate.
[2] Commercial fungicides.

From the data in Tables IV and V, it will be seen that tri-n-butyl (2-cyano-4,6-dichlorophenoxy) tin is an effective biocide for both oil-based and water-based paints. It imparted to these paints excellent resistance to attack by fungi which was maintained even after leaching. Unlike those containing phenylmercuric acetate, the paint films containing the biocide of this invention did not undergo any block or gray staining when they were exposed to hydrogen sulfide.

Each of the other organotin compounds disclosed herein also has biocidal properties that make it useful in many industrial and agricultural applications.

The terms and expression that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:
1. An organotin compound having the structural formula

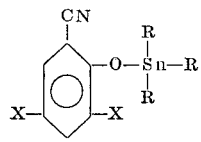

wherein each R represents an alkyl group having from 4 to 8 carbon atoms or a phenyl group; one of the X substituents represents halogen; and the other X substituent represents hydrogen or halogen.

2. An organotin compound as set forth in claim 1 wherein each R represents butyl and each X represents chlorine.

References Cited
UNITED STATES PATENTS
3,129,236  4/1964  Weissenberger _____ 260—429.7
3,409,653  11/1968  Stamm _____ 260—429.7

TOBIAS E. LEVOW, Primary Examiner
W. F. W. BELLAMY, Assistant Examiner

U.S. Cl. X.R.
71—97; 424—288

UNITED STATES PATENT OFFICE
CERTIFICATE OF CORRECTION

Patent No. 3,560,540     Dated February 2, 1971

Inventor(s) Adolph J. Deinet

It is certified that error appears in the above-identified paten and that said Letters Patent are hereby corrected as shown below:

Column 1, line 5, after "07675" insert -- , assignor to Tenneco Chemicals, Inc., a corporation of Delaware. --. Colun line 53, "tri-n-octyl (2-cyano-4-bromo-4,6-di-" should read -- tri-n-octyl (2-cyano-4,6-di- --.

Signed and sealed this 17th day of August 1971.

(SEAL)
Attest:

EDWARD M. FLETCHER, JR.
Attesting Officer

WILLIAM E. SCHUYLER,
Commissioner of Pate